United States Patent
Li et al.

(10) Patent No.: US 7,200,285 B2
(45) Date of Patent: Apr. 3, 2007

(54) DETECTING SKEW ANGLE IN A SCANNED IMAGE

(75) Inventors: Xing Li, Webster, NY (US); Terri A. Clingerman, Palmyra, NY (US)

(73) Assignee: Xerox Corporation, Stamford, CT (US)

( * ) Notice: Subject to any disclaimer, the term of this patent is extended or adjusted under 35 U.S.C. 154(b) by 274 days.

(21) Appl. No.: 10/943,310

(22) Filed: Sep. 17, 2004

(65) Prior Publication Data
US 2006/0039628 A1 Feb. 23, 2006

Related U.S. Application Data

(63) Continuation of application No. 10/923,388, filed on Aug. 21, 2004.

(51) Int. Cl.
*G06K 9/36* (2006.01)
*H04N 1/04* (2006.01)
*G06K 9/20* (2006.01)

(52) U.S. Cl. .................. 382/289; 382/291; 358/488

(58) Field of Classification Search ............. 382/290, 382/289, 291, 296, 203, 282, 232, 312; 358/474, 358/488, 452, 493, 3–26; 702/151
See application file for complete search history.

(56) References Cited

U.S. PATENT DOCUMENTS

| | | | |
|---|---|---|---|
| 5,245,676 A | 9/1993 | Spitz | |
| 5,355,420 A | 10/1994 | Bloomberg et al. | |
| 5,528,387 A | 6/1996 | Kelly et al. | |
| 5,697,609 A | 12/1997 | Wagner | |
| 5,748,334 A | 5/1998 | Rees | |
| 5,818,976 A * | 10/1998 | Pasco et al. | 382/289 |
| 6,137,989 A | 10/2000 | Quesnel | |
| 6,310,984 B2 | 10/2001 | Sansom-Wai et al. | |
| 6,430,320 B1 | 8/2002 | Jia et al. | |
| 6,741,741 B2 | 5/2004 | Farrell | |
| 6,954,290 B1 * | 10/2005 | Braudaway et al. | 358/3.26 |
| 6,983,218 B2 * | 1/2006 | Ruiz et al. | 702/151 |

* cited by examiner

*Primary Examiner*—Yon J. Couso
(74) *Attorney, Agent, or Firm*—Michelle Waites

(57) ABSTRACT

Detecting skew and determining skew angle using the front of a document by determining background-to-document transitions. Incoming scanlines are interval sampled in the fast scan direction every nth pixel. The samples are collected and organized into a two dimension array comprised of scanline based rows and interval based columns. The collected and organized samples are analyzed by intervals to determine a scanline (row) where a specified sampling condition exceeds predetermined threshold. The corresponding row-interval point forms a background-to-medium transition point of the edge of a document. When two or more background-to-medium transition points are found from different intervals the skew angle can be determined using linear regression.

20 Claims, 4 Drawing Sheets

DETECTING SKEW ANGLE IN A SCANNED IMAGE

This is a continuation in part application of co-pending U.S. patent application Ser. No. 10/923,388 Entitled "Real-Time Processing of Grayscale Image Data" filed Aug. 21, 2004 and assigned to the assignee of the present disclosure.

TECHNOLOGY

Illustrated herein, generally, are systems and methods for processing scanned image data to detect skew in a scanned document and more particularly, to real-time detection of the angle of skew in s document using its leading edge.

BACKGROUND

Digital scanners are commonly used to capture images from hardcopy media. In a typical scanning operation, the surface of an original document is illuminated as an image sensor moves past the document detecting the intensity of light reflected from each location. These analog light intensity values are subsequently stored at corresponding pixel locations as proportionate electrical charges, which are collectively passed to an image processor where they are quantized to grayscale levels. Each grayscale level is represented by a multi-bit digital value that has a number of bits that is determined by the number of intensity levels that can be generated by the scanner. For example, in a scanner that represents grayscale levels using 8 bit words will be able to capture 256 ($2^8$) different intensity levels. The grayscale value for the level that provides the closest match to the intensity of light reflected from each location is assigned to the corresponding pixel. Thus, scanning captures analog input images by generating a stream of multi-bit values, with each location in the image being represented by a multi-bit digital word.

One or more scanners, printers, video displays and/or computer storage devices are often connected via a communications network to provide a digital reproduction system. For example, a digital copier may incorporate a scanner and a digital printer. While scanners capture hundreds of light intensity levels, digital output devices usually generate relatively few levels of output. For example, digital printers typically process binary output, for which a single bit is assigned to each pixel. During printing, marking material is either applied to or withheld from the pixel depending upon the assigned value. In a system with a digital printer and scanner, the grayscale data generated by the image capture device is usually rendered to binary format and stored in memory, from which it is subsequently retrieved by the output device. While it is possible to print data as it is rendered, storing it first provides several advantages. For one, when the data is stored, it is possible to print multiple copies of the same page without having to repeatedly re-scan the original document. It is also easier to transfer stored data between devices, as it can be compressed and decompressed.

Grayscale image data is often processed for improved image quality. In order to avoid data loss, image processing is preferably applied before the image is rendered. Well known image processing techniques are performed to improve image contrast, sharpness and color, to eliminate scanning artifacts, hole punches and other undesirable data and for many other reasons. For example, "skew" may be exhibited in an output image captured from an original document that became rotated relative to the image sensor before it was captured.

Skewed images are unappealing to the viewer and it is difficult to process skewed images in optical character recognition processes. Skew correction is a well known imaging process that may be applied to eliminate skew from a digital image. Since the contents of an image are viewed in relation to the edges of the page on which it is printed, known methods of eliminating skew include aligning the image with the edge of the document. More specifically, skew can be eliminated by determining the magnitude and direction of the document rotation relative to a document edge and applying a corresponding counter rotation to the image data. Most systems that digitally reproduce images use mechanical systems to properly align the document as it is transported to the scanning area. While mechanical systems and methods are useful, they cannot typically eliminate all of the skew from the document before it is placed on the scanning surface. As such, electronic systems and methods are employed to apply the fine tuning that is required to eliminate the remaining skew.

An accurate and robust digital image processing technique analyzes the entire scan to select the data that is most relevant for processing. Notably, each line in a skewed image straddles several more scanlines than its properly aligned counterpart. As electronic skew correction requires the storage of all of the data that will be processed during skew angle detection, skewed images include more data and therefore, require additional storage space and skew correction requires additional processing time. Many skew correction techniques store all of the data that will be processed by simply storing the entire image. Other techniques perform a preliminary analysis of the image and store a subset of the image data that is selected based upon the outcome of certain assumptions.

One-pass scanners process image data "on-the-fly," i.e., the grayscale data is generated, processed and rendered in real-time. Since it is generally too expensive to store all of the grayscale image data for an entire scan (i.e., multi-bit grayscale values for every pixel in the image) at a rate that is fast enough to keep pace with the scanning rate, one-pass scanners almost always store only a subset of the scanned data. Known processes calculate skew angle using the top edge of a document to detect transitions between the background (no document) and the document in the fast scan direction. While these approaches have proven useful, they are often prone to errors due to their sensitivity to noise. They also tend to require relatively complex logic in order to process the data that is collected for the skew angle determination.

It is therefore, beneficial to provide a system and method for processing a grayscale image in real-time to detect the skew angle in a digital image. In one aspect, it is advantageous to calculate skew based upon background to medium transitions found at the leading edge of the document

PRIOR ART

U.S. Pat. No. 5,245,676, discloses calculating skew angle by choosing pixel color transitions, selecting an alignment, determining the locations of pixel color transition points for the selected alignment; and calculating the power of the alignment from the locations of the pixel color transition points.

U.S. Pat. No. 5,528,387 discloses a system for electronically registering an image on an input document. The system detects the corners and center of the leading edge of the document being scanned; calculates the skew angle of the document; and rotates the electronic representation of the input image based on the calculated skew angle.

U.S. Pat. No 6,310,984 describes a method of automatically determining a skew angle of a scanned document by defining left and right image boundaries for groups of scanlines; digitally forming edge segments by extending image boundaries between successive groups of scanlines; and calculating a slope of all of the digitally formed edge segments that are longer than a predetermined length.

U.S. Pat. No. 6,741,741 discloses detecting document edges by scanning a portion of the document against a substantially light reflecting backing and then against a substantially light absorbing backing document edges are detected by comparing the data from the two scans.

SUMMARY OF THE INVENTION

Aspects disclosed herein include a method that includes generating a plurality of scanlines of grayscale image data that represent an original document captured inside a scan area; interval sampling the captured grayscale image data to provide intensity values for corresponding pixels in the plurality of scanlines; creating a two-dimensional array of relative intensity values for the plurality of scanlines, with relative intensity values for pixels from a same scanline arranged in a same array row and relative intensity values for pixels from a same sampling interval arranged in a same array column; from the relative intensity values, identifying a plurality of background-to-medium transition points for the grayscale image data; and determining a skew angle of the original document based upon a location of a plurality of the background-to-medium transition points.

In another aspect, a machine readable medium having instructions stored thereon that when executed by a processor cause a system to generate a plurality of scanlines of grayscale image data that represent an original document captured inside a scan area; interval sample the captured grayscale image data to provide intensity values for corresponding pixels in the plurality of scanlines; create a two-dimensional array of relative intensity values for the plurality of scanlines, with relative intensity values for pixels from a same scanline arranged in a same array row and relative intensity values for pixels from a same sampling interval arranged in a same array column; from the relative intensity values, identify a plurality of background-to-medium transition points for the grayscale image data; and determine a skew angle of the original document based upon a location of a plurality of the background-to-medium transition points.

DETAILED DESCRIPTION

Figure 1:
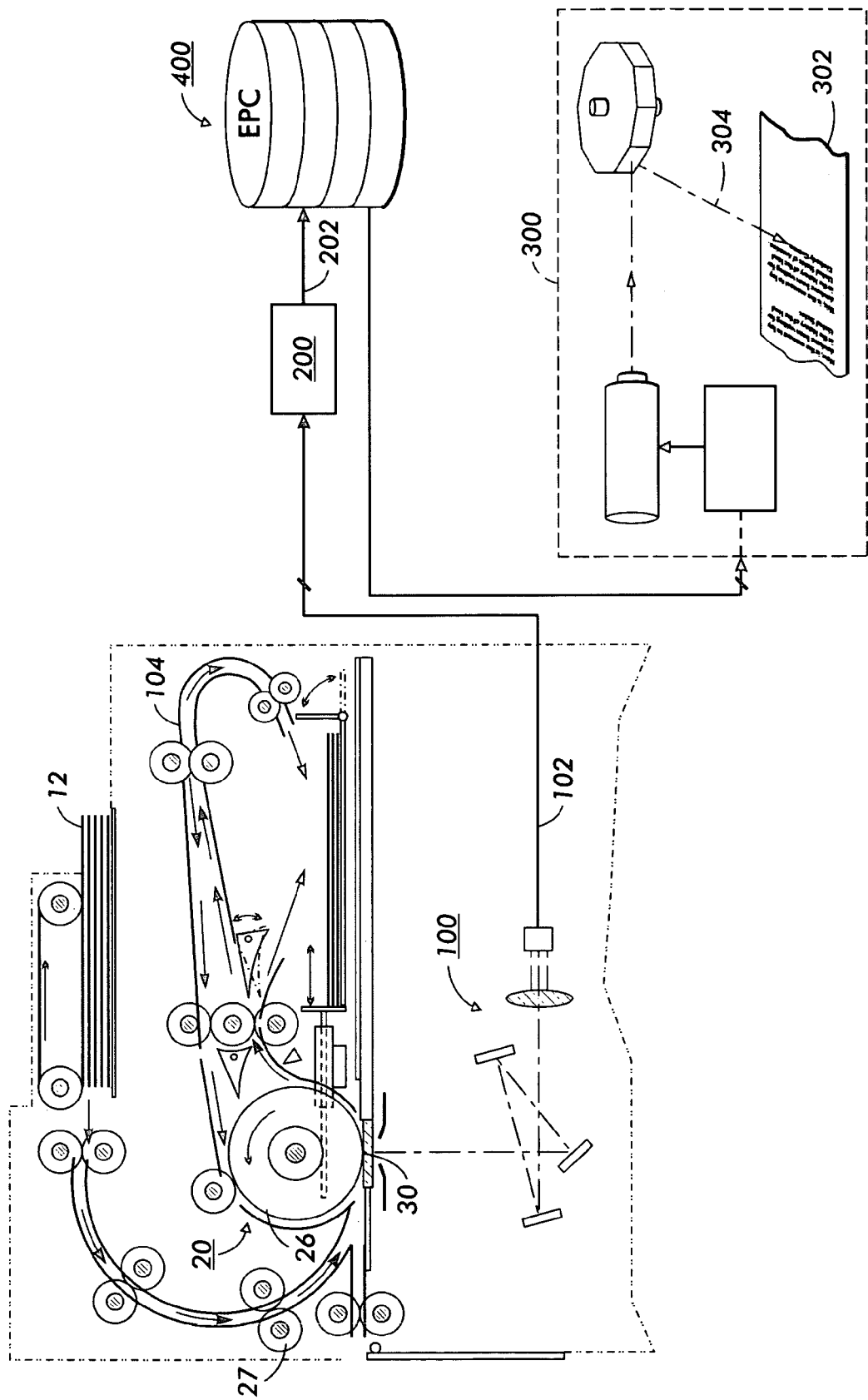
FIG. 1 provides one example of a system for digitally reproducing hardcopy images.

For a general understanding of the present system and method, reference is made to the drawings. In the drawings, like reference numerals have been used throughout to designate identical elements. In describing the present system and method, the following term(s) have been used in the description:

A "raster input scanner," also referred to as a "RIS" or a "scanner" is a device that captures images from a hardcopy medium and converts them to digital format. The term "scanner" includes any such device, whether flat-bed, hand-held, feed-in, and includes devices that capture images in color or only in black-and-white.

The "fast-scan direction" refers to the direction of relative motion between the image sensor and the input image as the sensor moves past the original document capturing light intensity data from the input image. The "slow scan direction" refers to the direction of relative motion between the document and the imaging system to facilitate the sequential capture of data in different scanlines. The slow scan direction lies normal to the fast-scan direction and is typically the direction in which documents are transported to the scanning surface.

A "pixel" refers to an image signal having a density between white (i.e., 0) and black (i.e., the maximum available intensity value) that is associated with a particular position in an image. Accordingly, pixels are defined by intensity and position. The term "pixel" refers to such an image signal in a single separation. A "color pixel" is the sum of the color densities of corresponding pixels in each separation.

A "scanline" is the set of pixels that represents the data captured in a single sweep of the image in the fast-scan direction.

"Scan area" and "scanning surface" refer to the entire location that is captured by the scanner, which typically includes the document bearing the image and the scanner background.

"Data" refers to physical signals that indicate or include information and includes information that exists in any physical form. For example, data could exist as electromagnetic or other transmitted signals, it could exist as signals that are stored in electronic, magnetic, or other form, and it may be information that is transitory or is in the process of being stored or transmitted. Data is typically processed by a set of instructions, such as a software program or application, to generate output.

Data that is processed in "real-time" is processed as it is received.

"Gray level" refers to one among several available increments of image intensity that vary between a minimum value and a maximum, regardless of the color of the separation in which one or more of the levels may be found. The term "gray" does not refer to a color unless specifically identified as such.

A "grayscale value" is a numerical value that indicates the optical density of an image at a given pixel.

A "document" includes any medium that is capable of bearing a visible image. An "original document" is a document that bears the image that is being or has been presented for digital capture.

An "image" is generally a pattern of physical light that may include characters, words, and text as well as other features such as graphics. An entire image is typically represented by a plurality of pixels arranged in scanlines.

"Image data" refers to information that represents an image. "Original image data" is image data that is delivered to a system or device by an external source. "Grayscale image data" refers to image data that represents and black and white and/or color images that have multiple luminance levels, with each pixel defined at a single optical density.

"Memory" is any circuitry that can store data, and may include local and remote memory and input/output devices. Examples include semiconductor ROMs, RAMs, and storage medium access devices with data storage media that they can access.

"Skew" refers to distortion in an image that results from rotation of an input image relative to an identified reference point. "Skew angle" is amount of displacement measured in an image as a result of the introduction of skew.

An "edge" refers to the boundary of the original document, e.g., top, bottom, left, right. The "lead edge" of a document is the edge of the document that is positioned in the document feeder or scanning area to be the first edge captured by the image sensor.

"Background-to-medium transition points" are locations in a grayscale image where pixels that represent the scanner hardware lie adjacent to those that represent the original document.

Generally, digital reproduction systems include an image source, which provides grayscale data that represents an original image; an image processor, which performs various image modifications and stores the processed data in an electronic pre-collation memory; and an output device, which retrieves the output formatted data and displays it in a viewable format. FIG. 1 provides an illustration of such a digital reproduction system 10. In the illustrated system 10, the image source is a raster input scanner (RIS) 100 and the output device is a xerographic digital printer 300. System 10 scans original documents 12 line-by-line, detecting the intensity of light reflected from each discrete location and storing it as a proportionate electrical charge in a corresponding pixel location. Printed reproductions are then provided by generating generate grayscale image data 102 that represents the intensity of light reflected from the image, which is rendered to binary format to provide hardcopy reproductions.

Original documents 12 are transported to scanning surface 30 in the direction of axis Y, often a via an automated constant velocity transport ("CVT") system 104. Generally speaking, CVT 104 includes a backing roll 20 rotatably mounted above the scanning area of RIS 100 for receiving original documents 12 from one or more transport rollers 26 and 27 and moving them across scanning surface 30. While the goal is usually to scan only original document 12, RIS 100 generates image data that represents the entire scan area, which typically includes backing roll 20 and other scanner hardware. Thus, the grayscale image data generated by RIS 100 represents an image of original document 12 and a surrounding background. Image processor (IP) 200 converts grayscale image data 102 to binary data 202 that is then stored in EPC 400.

To produce hardcopy reproductions, binary image data 202 is retrieved from EPC 400 as a continuous stream of electronic signals and used to modulated a light beam 204 that selectively discharges the surface of a uniformly charged imaging member 302. Toner material 306 is brought in contact with imaging member 302, adhering to the charged areas of the imaging member and the toner developed image is then transferred and permanently fixed to a copy sheet, thereby transforming the binary data retrieved from EPC 400 to markings that are printed on the output copy sheet. While system 10 is described as having binary image data 202 that is retrieved by from EPC by printer 300, it is understood that it is possible to reproduce images by transmitting binary image data 202 directly to printer 300, by making binary image data 202 available via a removable storage device or by any other appropriate delivery method.

Figure 2:
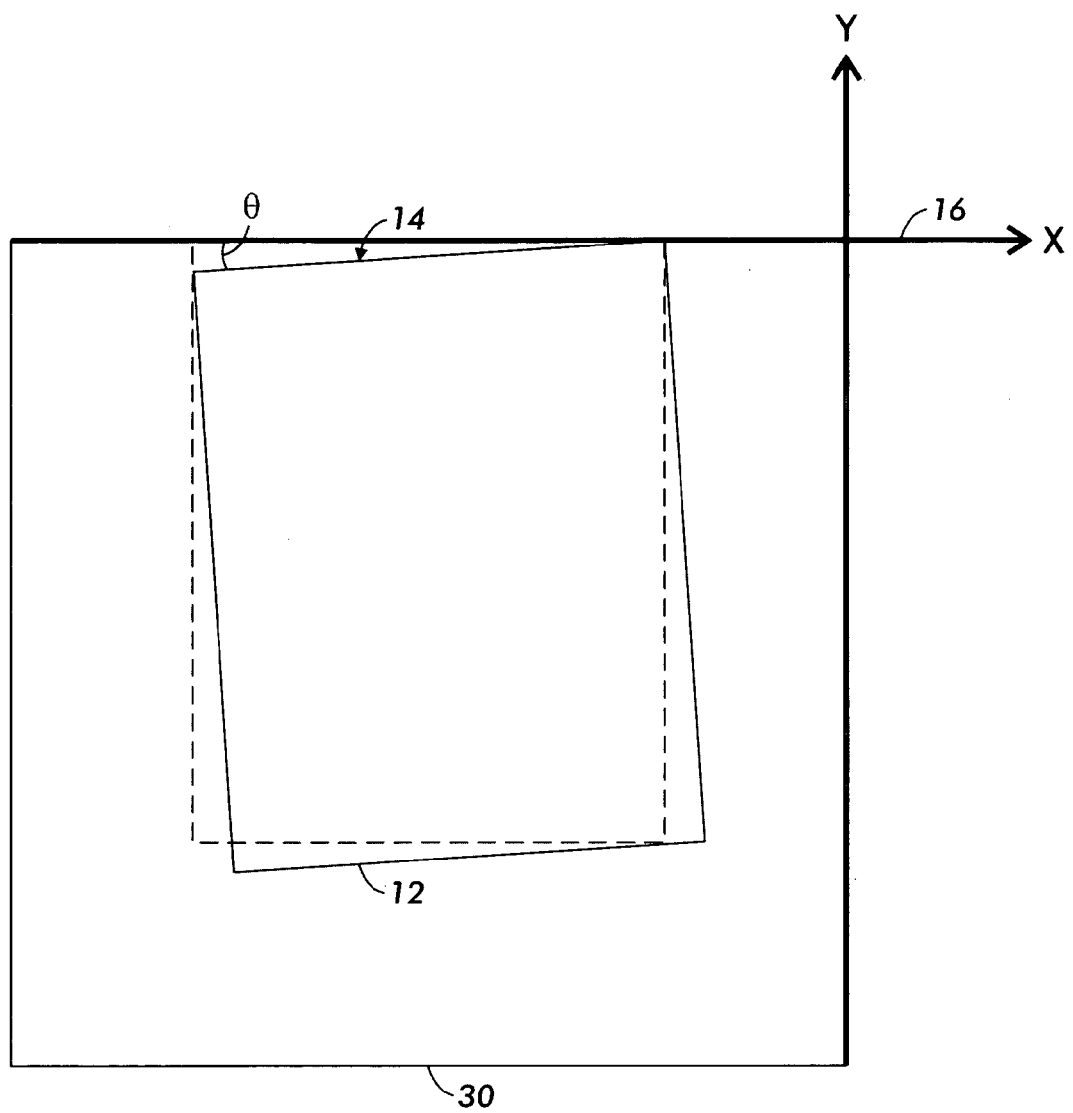
FIG. 2 is a detailed illustration of a skewed document showing a skew angle.

As shown in FIG. 2, a scanning surface 30 of a RIS 100 typically has a slow scan direction Y, which corresponds to document transport direction, and a fast scan direction X normal to direction Y. Ideally, document 12 will be placed on scanning surface 30 in perfect parallel alignment with axis X. However, if document 12 is not properly aligned before it is captured, its top edge 14 will instead form an angle Θ with axis X. Thus, the spatial coordinates for the image data pixels generated by RIS 100 will be rotated relative to the corresponding pixels in the input image, causing "skew" in the captured image data. This image data must be deskewed before it is printed or the output will not provide an accurate reproduction of the image displayed on original document 12.

Figure 3:
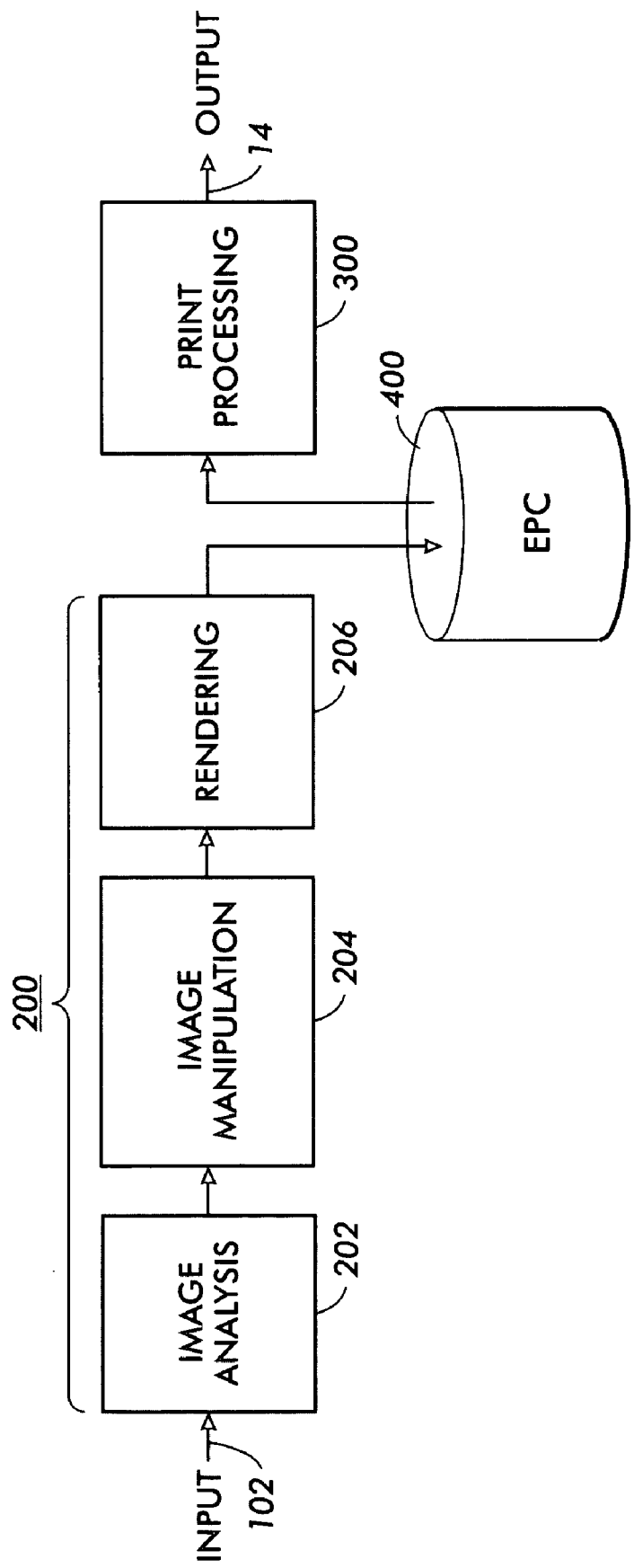
FIG. 3 is a block diagram showing an image processor that may incorporate features of the present systems and methods.

FIG. 3 provides a general description of the operation of IP 200 of FIG. 1. For simplicity, IP 200 is shown in FIG. 2 as having an analysis module 202, a manipulation module 204 and a rendering module 206. However, it is understood that separate and distinct modules are not required, that IP 200 will typically perform numerous other operations and that some or all of those operations may use portions or all of the same data, algorithms, subroutines and other information. Generally, analysis module 202 performs functions that relate generally to analyzing the image to determine its content, such as background detection and image segmentation, manipulation module 204 modifies the grayscale data depending upon its content and rendering module 206 then converts the modified grayscale data to the format used by the output device. It is preferable to modify the grayscale data before rendering the image, in order to minimize data losses. However, the image data can be modified after rendering if necessary. Once the data is formatted for output it is stored in EPC 400.

There are usually identifiable differences between a document 12 being scanned and backing roll 20 or other background elements of RIS 100, including, for example, differences in color, reflectance, transmission, and depth. For example, most office documents are often printed on white sheets of paper that have brightness levels between 84 and 100. Backing roll 20 and the other scanner hardware can therefore, be easily distinguished by the scanner if the light reflected from their surfaces provide gray scale values that are different from those of documents with brightness levels that fall in this range. Since document edges are located at the boundaries between regions with distinct gray scale properties, the edges of document 12 can be identified by comparing gray scale values for each pixel to a threshold value. This threshold value can be pre-set, programmed, programmable, or adjustable in accordance with system requirements.

Figure 4:
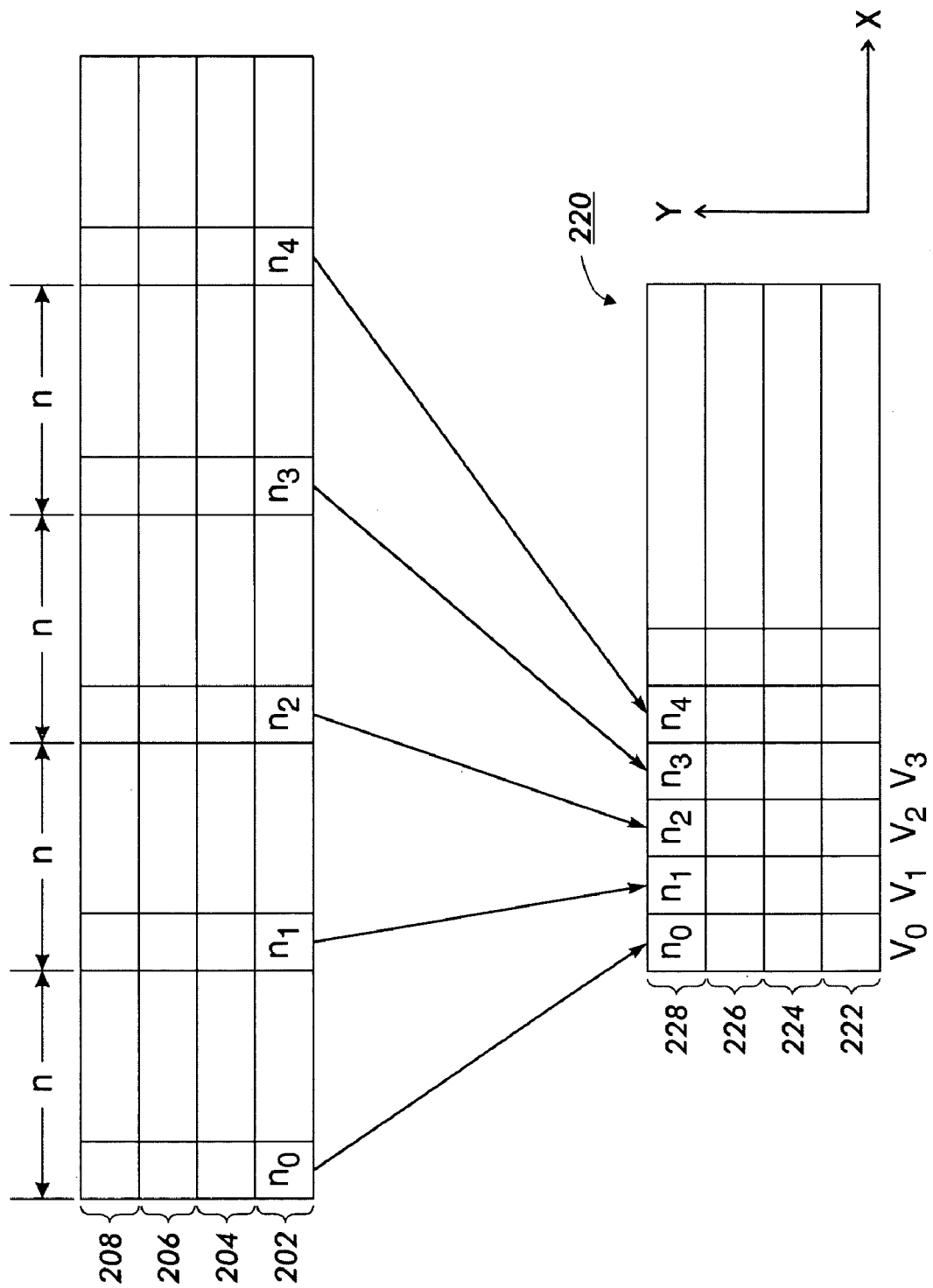
FIG. 4 illustrates data sampling and two-dimensional array formation in accord with the principles of the present system and method.

Turning to FIG. 4, in one aspect, document 12 may be transported onto scanning surface 30 in slow scan direction Y and scanning can proceed in direction X. Skew angle for leading edge 14 can be detected by sampling input video signals in fast-scan direction X at regular periodic intervals (e.g. every $n^{th}$) pixel for a subset of pixels in the image and analyzing the sampling results to identify background-to-medium transition points.

In the present system and method, each scanline (e.g. row) is divided into a plurality of sampling intervals (e.g. columns) that repeat every n pixels. There are several ways to determine the number of samples that will be analyzed. For example, sampling could continue until a pre-set number (e.g. 100) of sample points or scanlines have been analyzed or have passed a lead edge sensor 16 (shown in FIG. 2) or some other identified mark. A set of values that can be used to determine the angle of skew in the document can then be obtained by sampling all of the scanlines in the selected set at each interval.

FIG. 4 shows four consecutive scanlines of a grayscale image: a scanline 202 that is currently being captured, a scanline 204 that was captured immediately prior to scanline 202, a scanline 206 captured prior to scanline 204 and a scanline 208 captured prior to scanline 206. As shown in FIG. 4, the image is searched for background-to-medium transition points at each sampling interval n, with n generally being limited only by the span of the document. For example, a sampling interval may be 32 pixels, 64 pixels, 128 pixels, etc.

Again, two dimensional "sliding" array 220 of FIG. 4 has four rows. However, it is understood that array 200 could be provided in many sizes and that the use of four rows is for purposes of discussion only. As each new line is scanned, the gray level for the currently sampled pixel is compared to that of the previously scanned line and the background-medium transition point for each interval is recorded as the first pixel where the gray level exceeds that of the previous line by more than a threshold.

For example, scanlines 202, 204, 206 and 208 are sampled every 64 pixels. When the image sensor begins to scan the current line, pixel $n_0$ is sampled in line 202, its intensity value is compared to a threshold and a 1 is placed in row 222 in column 230 if the gray level of the sampled pixel exceeds that of the pixel in the same interval for the previous scanline by more than a threshold amount. If the gray level for pixel $n_0$ is less than or equal to the threshold, nothing is stored. Samples are taken at subsequent intervals $n_1$, $n_2$, $n_3$ and $n_4$ and the process is repeated, with sampling returning to interval a $n_0$ as the next line is captured. For each row of array 220, the first column that has a "1" is identified as a background-to-medium transition point.

Thus, background-to-medium transition points are generally defined as locations with intensity values that satisfy a specified sampling condition. In one aspect, background-to-medium transition point for a given interval is identified as the first scanline corresponding to an array 220 value "v" that satisfies the condition:

$$\frac{\text{array}[N-3] + \text{array}[N-2]}{2} - \frac{\text{array}[N-1] + \text{array}[N]}{2} > T$$

For each newly scanned line, pixels $n_0$, $n_1$, $n_2$, $n_3$ and $n_4$ are captured and their grayscale intensity values $v_0$, $v_1$, $v_2$, $v_3$ and $v_4$ are stored in array 220 when they exceed the threshold. For each interval, the background-to-medium transition point will be found in the scanline corresponding to the first row in array 220 where the gray scale value exceeds the threshold.

Background-to-medium transition points for two or more intervals can be entered into a least squares fit or other standard linear regression to derive the slope of top edge 14 of document 12 to obtain skew angle Θ (described with reference to FIG. 2). Skew angle Θ can then be applied to all of the grayscale image data and skew will be eliminated from the image. The skew corrected image is rendered to binary and stored in EPC 400 for retrieval by printer 300. It is noted that skew angle Θ may be made available to system 10 as a permanent or adjustable value and it may be set by the system manufacturer, a service technician or a system user.

It should also be noted that the number of rows (scanlines) and columns (intervals) in the two-dimensional array 220 can vary as required to fulfill the requirements of a particular application. It should also be understood that it is not necessary to use a complete scanline. For example, sampling interval 0 might start a predetermined number of pixels into a scanline, while the last sampling interval may be located well inside a fast scan direction outer edge 18 of a de-skewed document.

The principles of the present system and method are generally applicable to any application that uses the slope of one or more document edges or the skew angle of a document. Furthermore, it should be understood that the principles of the present system and method are applicable to a very wide range of apparatus, for example, copiers, facsimile machine, printers, scanners, and multifunction devices and that they are useful in machines that reproduce black and white and color images by depositing ink, toner and similar marking materials.

Although the present system and method has been described with reference to specific embodiments, it is not intended to be limited thereto. Rather, those having ordinary skill in the art will recognize that variations and modifications, including equivalents, substantial equivalents, similar equivalents, and the like may be made therein which are within the spirit of the invention and within the scope of the claims.

What is claimed is:

1. A method, comprising:
   generating grayscale image data corresponding to an original document inside a scan area;
   interval sampling a plurality of grayscale image data scanlines to provide intensity values for pixels from at least two image data scanlines belonging to a same interval sample;
   creating a two-dimensional array of intensity data for a plurality of said same interval sample pixels, with intensity data for pixels from a same scanline arranged in a same array row and intensity data for pixels from a same interval sample arranged in a same array column;
   from said intensity data, identifying a plurality of same interval sample background-to-medium transition points for said grayscale image data; and
   determining a skew angle of said original document based upon a location of a plurality of said same interval sample background-to-medium transition points.

2. The method of claim 1, wherein said skew angle determination is obtained using a linear regression of a plurality of said two-dimensional array relative intensity values.

3. The method of claim 1, wherein said background-to-medium transition points are identified as a first pixel collected in a respective interval where an intensity value exceeds a threshold value.

4. The method of claim 1, wherein said interval sampling provides intensity values for pixels that are aligned in a slow scan direction.

5. The method of claim 1, where determining the plurality of background-to-medium transition points is performed as each successive row is added to said two-dimensional array.

6. The method of claim 1, wherein interval sampling is performed by measuring said grayscale image data every $n^{th}$ pixel, where n is an integer.

7. The method of claim 1, wherein the skew angle is determined relative to the fast scan direction.

8. A comnuter readable medium encoded with a data structure that when executed by a processor causes a system to:
   generate grayscale image data corresponding to an original document inside a scan area;
   interval sample a plurality of grayscale image data scanlines to provide intensity values for pixels from at least two image data scanlines belonging to a same interval sample;
   create a two-dimensional array of intensity data for a plurality of said same interval sample pixels, with intensity data for pixels from a same scanline arranged in a same array row and intensity data for pixels from a same interval sample arranged in a same array column;
   from said intensity data, identify a plurality of same interval sample background-to-medium transition points for said grayscale image data; and
   determine a skew angle of said original document based upon a location of a plurality of said same interval samole background-to-medium transition points.
   determine a skew angle of said original document based upon a location of a plurality of said slow scan direction background-to-medium transition points.

9. The computer-readable medium of claim 8, wherein said skew angle determination is performed using a least squares fit of the values in the two-dimensional array.

10. The computer-readable medium of claim 8, wherein said background-to-medium transition points are identified as a first pixel in a respective interval where an intensity value exceeds a threshold value.

11. The computer-readable medium of claim 8, wherein said interval samples provides intensity values for that pixels are aligned in a slow scan direction.

12. The computer-readable medium of claim 8, wherein determining the plurality of background-to-medium transition points is performed as each successive row is added to said two-dimensional array.

13. The computer-readable medium of claim 8, wherein interval sampling is performed by measuring the input video signals at every nth pixel of a scan line, where n is an integer.

14. A system, comprising:
   a document transport that moves an original document in a slow scan-direction direction to a scanning surface;
   an image sensor that moves across said original document in a fast scan direction detecting the intensity of light reflected from said scanning surface and converts said reflected light into digital image data; and
   a processor that interval samples said grayscale image data to provide intensity values for pixels from at least two image data scanlines belonging to a same interval sample, creates a two-dimensional array of intensity data for a plurality of said same interval sample pixels identifies a plurality of same interval sample background to medium transition points and determines a skew angle of said original document based upon a location of a plurality of said same interval sample background-to-medium transition points.

15. The system of claim 14 wherein said two-dimensional array is arranged such that relative intensity values for pixels from a same scanline are located in a same array row and relative intensity values for pixels from a same sampling interval are located in a same column.

16. The system of claim 14, wherein said processor determines said skew angle using a standard linear regression of the two-dimensional array sample values.

17. The system of claim 14, wherein said processor determines said first background-to-medium transition point using a specified sampling condition to determine if sample values of a first interval cause said specified sampling condition to exceed a threshold value.

18. The system of claim 14, wherein said processor provides intensity data for pixels from at least two image data scanlines that are aligned in a slow scan direction.

19. The system of claim 14, wherein interval sampling is performed by measuring said input video signals at every nth pixel, where n is an integer.

20. The system of claim 14, wherein said sampling interval is 64 pixels.

* * * * *